(12) United States Patent
Siegel et al.

(10) Patent No.: US 7,639,386 B1
(45) Date of Patent: Dec. 29, 2009

(54) AUTOMATED CREATION OF PRINTED WORKS HAVING CUSTOMIZED AND/OR PERSONALIZED CONTENT

(75) Inventors: Hilliard B. Siegel, Seattle, WA (US); Daniel Rose, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 876 days.

(21) Appl. No.: 11/173,821

(22) Filed: Jul. 1, 2005

(51) Int. Cl.
*G06F 15/00* (2006.01)
*G06Q 40/00* (2006.01)

(52) U.S. Cl. ..................................... 358/1.18; 705/38

(58) Field of Classification Search ................ 358/1.18, 358/1.15, 1.13, 1.12, 1.16; 705/2, 4, 10, 705/14, 51, 54, 38, 64; 713/150, 153, 189, 713/193; 700/215, 227, 233; 707/3, 10, 707/104.1
See application file for complete search history.

(56) References Cited

U.S. PATENT DOCUMENTS

| | | | |
|---|---|---|---|
| 6,012,890 A | 1/2000 | Garrido | |
| 6,213,703 B1 * | 4/2001 | Garrido | 412/19 |
| 6,477,542 B1 | 11/2002 | Papaioannou | |
| 6,711,554 B1 * | 3/2004 | Salzmann et al. | 705/64 |
| 6,735,569 B1 * | 5/2004 | Wizig | 705/4 |
| 6,839,609 B2 * | 1/2005 | Rice, Jr. | 700/227 |
| 6,839,720 B1 | 1/2005 | Thibodeau | |
| 7,047,033 B2 * | 5/2006 | Wyler | 455/552.1 |
| 7,139,095 B1 * | 11/2006 | Hunter | 358/1.18 |
| 2005/0129229 A1 * | 6/2005 | Auslander et al. | 380/55 |

OTHER PUBLICATIONS

"ReportEdge Brochure," Advanced Customer Reporting, Investedge—Wealth Management Solutions, last accessed Dec. 6, 2005 (1 page) http://www.investedge.com/products/reportedge.html.
"Print On Demand," Warnings and Cautions for Writers, Page Updated Nov. 4, 2005, last accessed Feb. 10, 2005 (9 pages) http://www.sfwa.org/beware/printondemand.html.
"Garp QuickQuote," last accessed Feb. 11, 2005 (2 pages) http://www.garponline.com/quickquote/quickquote1.html.
"GARP Copy Writing Service," GARP Online, last accessed Feb. 10, 2005 (1 page) http://www.garponline.com/frmain.html.
"Research services for college research papers & term papers," LazyStudents.com, last accessed Feb. 10, 2005 (2 pages) http://www.lazystudents.com/research_papers.html.

* cited by examiner

*Primary Examiner*—Saeid Ebrahimi Dehkordy
(74) *Attorney, Agent, or Firm*—Thomas, Kayden, Horstemeyer & Risley, LLP

(57) ABSTRACT

A facility for generating printed works containing customized or personalized content is described. The facility may electronically provide users with access to information about a collection of content that is available for incorporation into the printed works. The facility may receive content selection instructions from the user for selecting items of content from the collection of content to generate a customized or personalized printed work. In some cases, the instructions may facilitate an automatic content selection process to generate a personalized printed work. Based on the instructions, the facility may select and retrieve the desired items of content and then aggregate them into an electronic document. Prior to generating the customized or personalized printed work, the facility may reformat the items of content within the electronic document based on user formatting instructions. The facility may then arrange for delivery of the printed work to the user.

23 Claims, 9 Drawing Sheets

AUTOMATED CREATION OF PRINTED WORKS HAVING CUSTOMIZED AND/OR PERSONALIZED CONTENT

TECHNICAL FIELD

The described technology is directed to the field of publishing, and more specifically, to generating customized and/or personalized printed works containing information of interest.

BACKGROUND

In *The Sermons of Henry Ward Beecher* (1870), Mr. Beecher states:

"Books are the windows through which the soul looks out. A home without books is like a room without windows."

Indeed, humans have held a special appreciation for books and other written works for thousands of years, and continue to do so today. In today's information society, people have access to a vast universe of electronic works, including electronic books, articles, news stories, and countless other electronic publications containing combinations of text, charts, images, photos, etc. People also continue to access a broad variety of printed works in more traditional paper form by going to libraries, bookstores, and newsstands, or by subscribing for home or office delivery of newspapers and periodicals. As the number of sources of written works has proliferated, however, and the means for acquiring those works has increased, people have found it more and more difficult to monitor and consume all of the sources of information that interest them. For example, while it has become popular for people to create lists of hyperlinks to different web pages having information about a particular topic, using such lists requires access to an electronic device and appropriate connectivity or caching to access all of the linked-to information. While accessing information of interest with an electronic device has the advantage of allowing a user to instantly get the most up-to-date information, it can also be cumbersome at times. For example, the battery life of electronic devices can be unsuitable for trans-Atlantic flights, while the displays of electronic devices can be unsuitable when vacationing on a beach. In contrast, printed works are much more suitable for these challenging environments—but finding, purchasing, and transporting all of the printed works on a particular topic can be so challenging that most consumers won't make the effort. It would therefore be advantageous if people were able to aggregate various works of information in which they are interested, and put such works into a form that can be more readily consumed.

DETAILED DESCRIPTION

Figure 1:
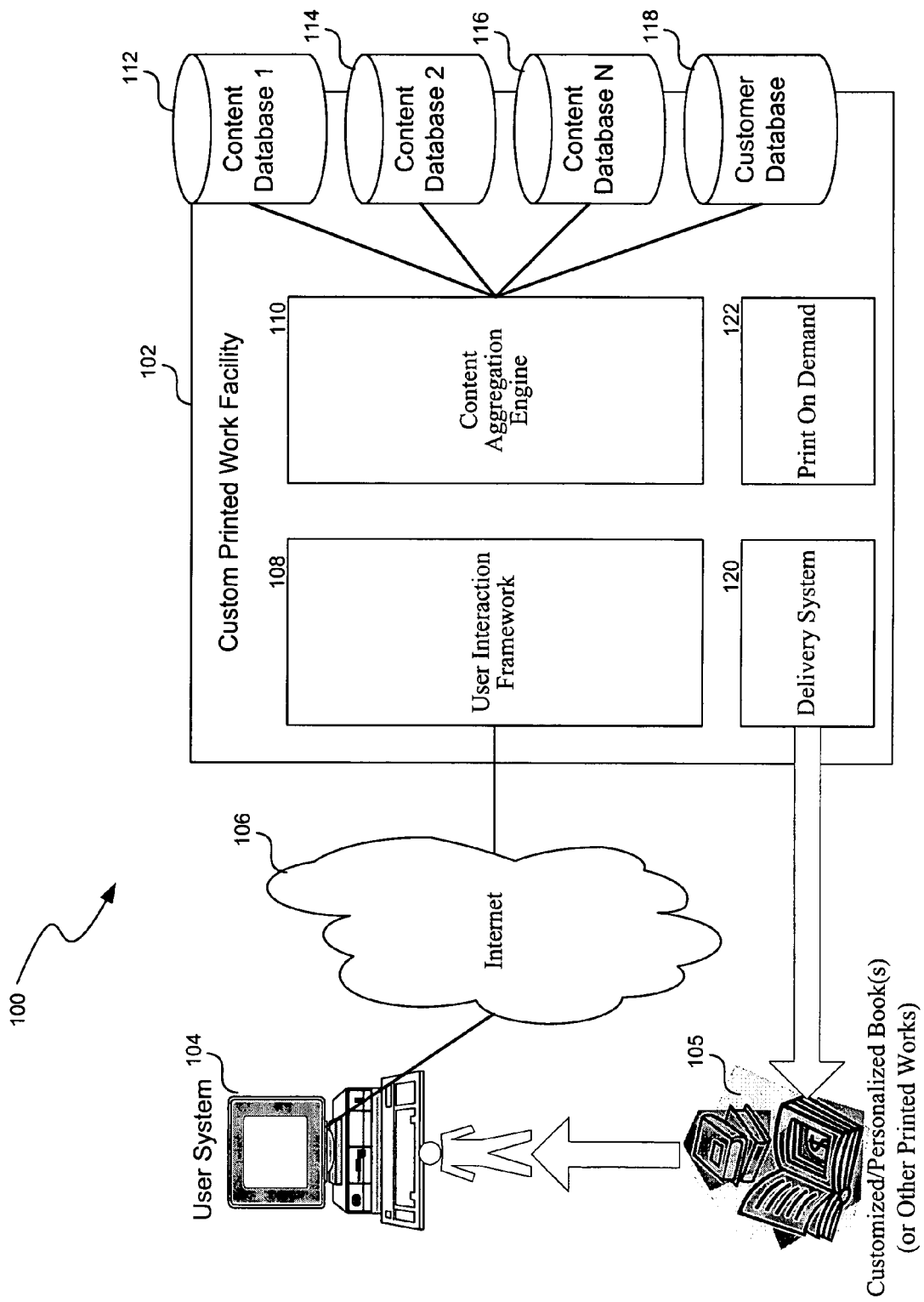
FIG. 1 is a high-level block diagram showing typical components of a computer system or other device upon which the facility for generating customized and/or personalized printed works executes in some embodiments.

A software facility for generating customized and/or personalized printed works ("the facility") is described. In some embodiments, the facility provides access to a universe of available documents, materials, and other information from which users may select content to include in their own customized printed works. For example, the universe of available documents, materials, and other information may include books, articles, papers, blogs (or other types of informal, user-provided works), web pages, transcripts, maps, stories, quotations, illustrations, photographs, poems, sections or excerpts of any of the foregoing, or any other information that can be printed on paper (in whole or in part) or otherwise presented in a physical form (e.g., as a book, journal, or other physical form such as Braille). To facilitate the selection of content from the universe of content, in some embodiments, the facility provides various ways for users to locate particular content, such as through a searchable database or browsable catalog of available works. The content may be distributed both within and external to the facility.

In some embodiments, the facility enables users to create their own original content and provide it to the facility to include in a printed work containing other materials. Examples of original content include an annotation to a work, an introduction to a collection of materials, a poem written by the user, personal photographs, etc. Accordingly, the facility may provide one or more input means for receiving such original content from users.

Once a user has selected and/or provided a desired collection of content, the facility may provide tools for the user to transform the content to ultimately produce a customized printed work. For example, in some embodiments, the facility provides tools that enable the user to organize the relative arrangement of the content (e.g., determine the order of a collection of stories or the placement of pictures and illustrations), delete unwanted portions of the content (e.g., remove any references to offensive content or remove entire sections of content which are not of interest), and modify portions of the content (e.g., integrate annotations or personal notes, translate parts or all of the content into another language, globally change words or names in the content, etc.). In some embodiments, the facility provides tools so that the user may customize the "look and feel" of the content (e.g., change the font or size of print, emphasize sections of text using bold print or italics, add color, highlighting, etc.). As with the content, the provided tools may be distributed both within and external to the facility.

After the collection of content has been transformed, in some embodiments, the facility offers printing and delivery services to the user. For example, the facility may offer one or more printing and binding options (e.g., ranging from staples and paperclips to hard cover leather bindings). The facility may then schedule the completed printed work to be shipped to the user.

In some embodiments, the facility enables users to set up document generation and printing rules that allow the facility to automatically generate a personalized printed work on a periodic basis (e.g., daily, weekly, monthly, quarterly, etc.). For example, a user may specify to have the facility automatically generate a bi-weekly printed work that includes a weekly editorial column from the *New York Times*, all newly-published articles written by columnist Mark A. Rodgers, and all newly-released content from the Associated Press Newswire containing the keyword "extreme mountain biking." The user may also specify that the bi-weekly printed work is to be translated to Russian and printed in 16-point text on light blue paper.

In another example of document generation and printing rules, a user may set a maximum number of pages to avoid receiving an automatically generated printed work that is too large. In order to meet a selected page limit, users may invoke prioritization schemes for automatically selected content. For example, a user may specify the cover story from Fortune Magazine as a first priority, and any articles containing the keyword "e-commerce" in the title as a second priority. This helps ensure that the resulting personalized work contains the information that is most important to the user. In some embodiments, if timing allows, the user may be allowed to add "hand picked" content into an otherwise automatically generated personalized printed work. Thus, unlike ordinary published materials, the facility provides a means to create printed works that are meaningful and/or useful to them on a very personal and targeted level.

FIG. 1 is a high-level block diagram showing typical components of a representative environment 100 in which a printed works facility 102 may be implemented. For example, a user at a user system 104 may access the printed works facility 102 to create various customized printed works 105 that contain content of specific interest to the user (e.g., compilations of existing works, excerpts from existing works, and/or user-provided content, including original works by the user). The terms "book," "custom book," "work," and "printed work" are used herein to describe any tangible output of the printed works facility 102, and may include items such as hardcover books, paperback books, pamphlets, posters, leaflets, "glossy" journal type publications, books with audio features, notepads, Braille books, images or text printed on paper, etc. In some embodiments, the user system 104 communicates with the printed works facility 102 via a network such as the Internet 106.

While not illustrated in detail in FIG. 1, as is well known in the art, both the printed works facility 102 and the user system 104 may comprise one or more central processing units (CPUs), input/output devices, and one or more computer memories. Among the input/output devices may be storage devices, such as a hard disk drive; a computer-readable media drive, which can be used to install software products, including aspects of the facility or system, which are provided on a computer-readable medium, such as a CD-ROM; and a network connection for connecting to other computer systems. While the printed works facility 102 and the user system 104 may be implemented on a computer system or other device configured as described above, those skilled in the art will recognize that they may also be implemented on computer systems and devices having different configurations.

The memory of the printed works facility 102 may include various components such as a user interaction framework 108 and a content aggregation engine 110. The content aggregation engine 110 may communicate or be coupled to various content databases (e.g., 112, 114, and 116), as well as a customer database 118. These content databases (112, 114, and 116) may provide a set of existing content (as well as indications of future content) from which the user may select to create the printed work 105. For example, a first content database 112 may include various books on almost any subject that the user may wish to incorporate, while a second content database 114 may include various news publications or other reference materials. In addition to or instead of storing digital content, the content databases (112, 114, and 116) may also store indications of content stored external to the facility. For example, one or more of the content databases (112, 114, and 116) may include references or pointers to items stored in an external data source, such as an Associated Press database containing news articles, a government database, etc. In some embodiments, a separate data storage facility (not shown) may be used for storing such references or pointers.

While specific examples of content are described herein, the printed works facility 102 may provide or access virtually any type of publishable content and/or combination of publishable content for generating printed works, including manuscripts, papers, reports, fiction books, non-fiction books, dictionaries, encyclopedias, magazines, newspapers, photographs, illustrations, maps, government documents, legal documents, web site content, a user's personal blogs or diary content, blogs written by other users, private documents, informal textual works, and so forth. In addition to drawing from more traditional types of content, other less conventional sources may be used to generate customized and/or personalized printed works. For example, the printed works facility 102 may draw on product information from product manufacturer or retailer databases to generate customized product catalogs, wherein the generated catalogs include products of a certain type, style, size, brand, etc., that are tailored to a user. In another example, the printed works facility 102 may access various search engines to generate books containing aggregated personalized search results. In yet another example, the facility may access a user's hard disk drive to generate a customized printed work based on the contents of the hard drive.

In some embodiments, the customer database 118 may include user history information that the printed works facility 102 may use to generate content recommendations for a user. For example, user history information may include past content viewing habits of the user, purchasing habits of the user, etc. The customer database 118 may also store preferences that allow the content aggregation engine 110 to select content for automatically generated personalized printed works, and a record of the content that the facility previously incorporated into printed works for that user. In this way, the printed works facility 102 may alert the user to the possibility of incorporating previously used content into a printed work. Likewise, the printed works facility 102 may avoid duplicating the information provided in automatically generated printed works.

The memory of the user system 104 may contain various applications including a web browser and an operating system that allow it to connect to the Internet and, thereby, connect to the printed works facility 102. Upon establishing a connection with the printed works facility 102, the user may access tools associated with the user interaction framework 108 to select information from the content databases (e.g., 112, 114, and 116). Once the user selects the desired content through the user interaction framework 108, the content aggregation engine 110 may aggregate the content into a document that the user can further modify using additional tools associated with the user interaction framework 108. Examples of various tools provided by the user interaction framework 108 are described in more detail with respect to FIG. 2. Like the content sources used by the facility, the tools provided by the user interaction frame work may be either local or remote (e.g., the facility may employ third party searching capabilities, while relying on locally implemented formatting tools). In another example, the user's web browser is configured with a plug-in feature that allows the user to specify web sites containing content that the user may want to include in a custom printed work, such as by activating a user interface control displayed by the plug-in when pages of these web sites are displayed in the web browser. This plug-in feature may then interface with the facility to provide information about the user's selections.

In cases where the printed works facility 102 is automatically generating personalized printed works based on pre-specified rules and preferences (e.g., on a periodic basis), the user interaction framework 108 may retrieve such user preference information and apply the appropriate customization/formatting tools without the need for further user interaction.

Other components associated with the printed works facility 102 may include a delivery system 120 and a print on demand system 122. Accordingly, after completing a customization processes, the user, via the user interaction framework 108 may print the work 105 on demand. In some embodiments, the print on demand system 122 may include book binding and other book making capabilities. The print on demand system 122 may include multiple printing devices, which may vary in type, function, location, etc. For example, the printed works facility 102 may send a print request involving book binding to a printing device having binding capabilities and may send a high-volume print request to a printing device configured for large jobs. After printing, the delivery system 120 may deliver the printed work 105 to the user via a variety of delivery means (e.g., airmail, ground shipping, etc.). In some embodiments, the printed words facility 102 may provide the user with a printable electronic copy of the printed work 105 via, for example, email, web page, fax, etc., to enabling printing under the user's control.

Figure 2:
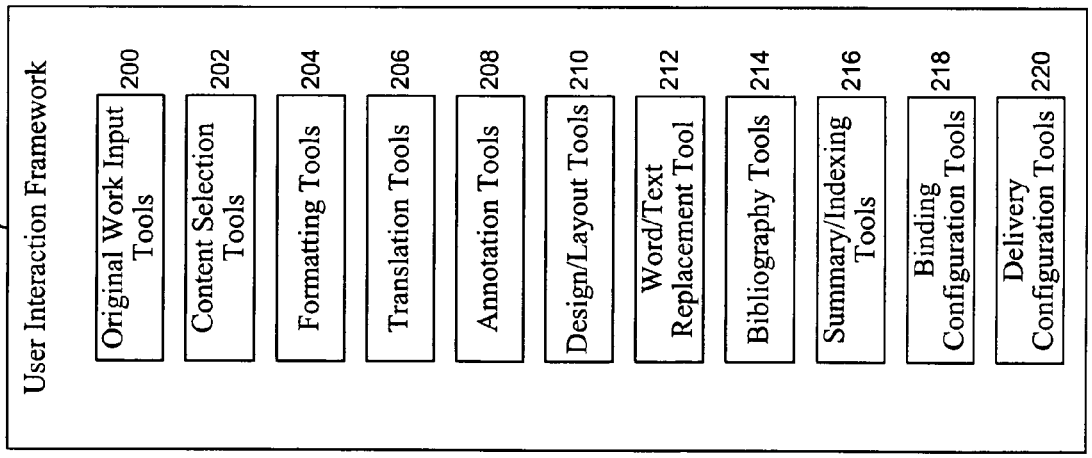
FIG. 2 is a block diagram showing an example of a user interaction framework suitable for use with the facility for generating customized and/or personalized printed works.

FIG. 2 is a block diagram showing an example of a user interaction framework, such as the user interaction framework 108 of FIG. 1. The user interaction framework 108 may provide various tools to allow a user to select, input, and modify content to create a customized book or printed work. For example, the user interaction framework 108 may include original work input tools 200, content selection tools 202, formatting tools 204, translation tools 206, annotation tools 208, design/layout tools 210, word/text replacement tools 212, bibliography tools 214, summary/indexing tools 216, binding configuration tools 218, delivery configuration tools 220, and so forth.

In some embodiments, the one or more original work input tools 200 may be used to allow the user to input his or her own original or personal content such as blog journal entries, poems, personal thoughts, photographs, etc. Likewise, the content selection tools 202 may include various tools that allow the user to select existing content (and possibly future content) from various content databases. For example, the content selection tools 202 may include a search and query function, a recommendation function, a browse function, and other functions that allow the user to select content from a specific work or set of works. The content selection tools may, thus, offer a variety of search strategies in addition to performing text searching (e.g., search by title, subject, keyword, etc.). Some examples of search strategies include allowing a user to select items from a catalog and then basing the search on metadata associated with the selected item, allowing the user to highlight content while browsing a web site or viewing a work and then basing the search on metadata associated with the highlighted items, allowing the user to select a "see more like this" option when viewing or browsing content and then basing the search on corresponding metadata, etc.

After the user selects content, thereby creating a work in progress, the user may invoke various tools of the user interaction framework 108 to collectively or individually manipulate aspects of the selected content to create a deliverable customized book or printed work having special meaning and/or use to the user. For example, the formatting tools 204 may allow the user to identify specific excerpts from the content that he or she has selected and change the formatting of the excerpts in a way that makes the most sense to him or her (e.g., by highlighting, underlining, bolding, changing the font size of, or other manipulation of the text). Another example of a formatting option that may be provided by the formatting tools 204 includes allowing a user to convert all the text in a printed version of the work into Braille. In some cases, the formatting tools 204 may be used along with filters or other related functionality. Such search filters may be applied to automatically identify and/or format certain words, phrases, or images that the user identifies. For example, an "inappropriate language" filter may be used to remove offensive or adult language from a printed work for use by children or sensitive audiences. Likewise, the facility may apply similar tools to exclude unwanted or irrelevant portions of content from the specified content. In addition to using direct user input to transform the content in the work in progress, in some cases, the facility may select the portions of content selected for transformation through one or more additional means. For example, the facility may exclude certain content based on a determination of whether content satisfies a popularity threshold calculated by the facility.

The translation tools 206 may provide foreign language translation. For example, the user may choose to translate parts of a book from French into English or vice versa. The annotation tools 208 may allow the user to provide notes or comments about certain aspects of the selected content. The design layout tools 210 may allow the user to modify the "look and feel" of the selected content. For example, the user may wish to add colors, arrange text in columns or tables, or perform other types of layout transformations.

A word/text replacement tool 212 may allow the user to globally replace certain words or text in the selected content to customize it in a way that he or she desires. For example, the user may replace a character's name with his or her name in a story, or come up with a custom term for some item described in the custom work. A bibliography tool 214 may allow the user to easily create a custom "bibliography" citing each source of content. Likewise, a summary/indexing tool 216 may automatically generate a summary, index, table of contents, glossary, chart, etc., for content contained in the printed work. The summary/indexing tool 216, or similar tools like it may also generate indexes or summary tables relating to images, such as printable thumbnail index for images. In some embodiments, the summary/indexing tool 216 relies on metadata associated with each item of selected content. The summary/indexing tool 216 may be paired with filters that allow a user to specify rules for the automatic summarizing/indexing. For example, using such filters, a user may specify that she wants an index by author, an index by subject matter, an index by keyword, a geographical index, a thumbnail index of images, etc.

In a similar way, the facility may pair any one of the various tools described above with filters or similar interfaces that allow users to at least partially automate the process of designating portions of the content to be modified. For example, a user may set a filter that indicates that each occurrence of the word "lavender" should be highlighted in purple. In another example, a user may set a global filter indicating that any content originating from a government source (e.g., statutes, regulations, etc.) should be printed in a certain style of font.

After finalizing the customization of the work in progress, the user may use the book binding tools 216 to specify the desired physical form for the printed work. For example, the user may specify a hard cover binding, a soft cover binding, special tabs, special book cover colors, glossy pages, ribbon markers, leaflets, etc. The user may then specify how and when the printed work will be delivered via the delivery configuration tools 218. For example, the user may request to have a custom book on beer brewing (including select recipes) sent as a gift to a friend. In another example, the user may request to have a periodically generated personalized printed work sent to his or her home on a certain day of the week or sent to a particular location (e.g., office, home, airport, etc.).

Figure 3:
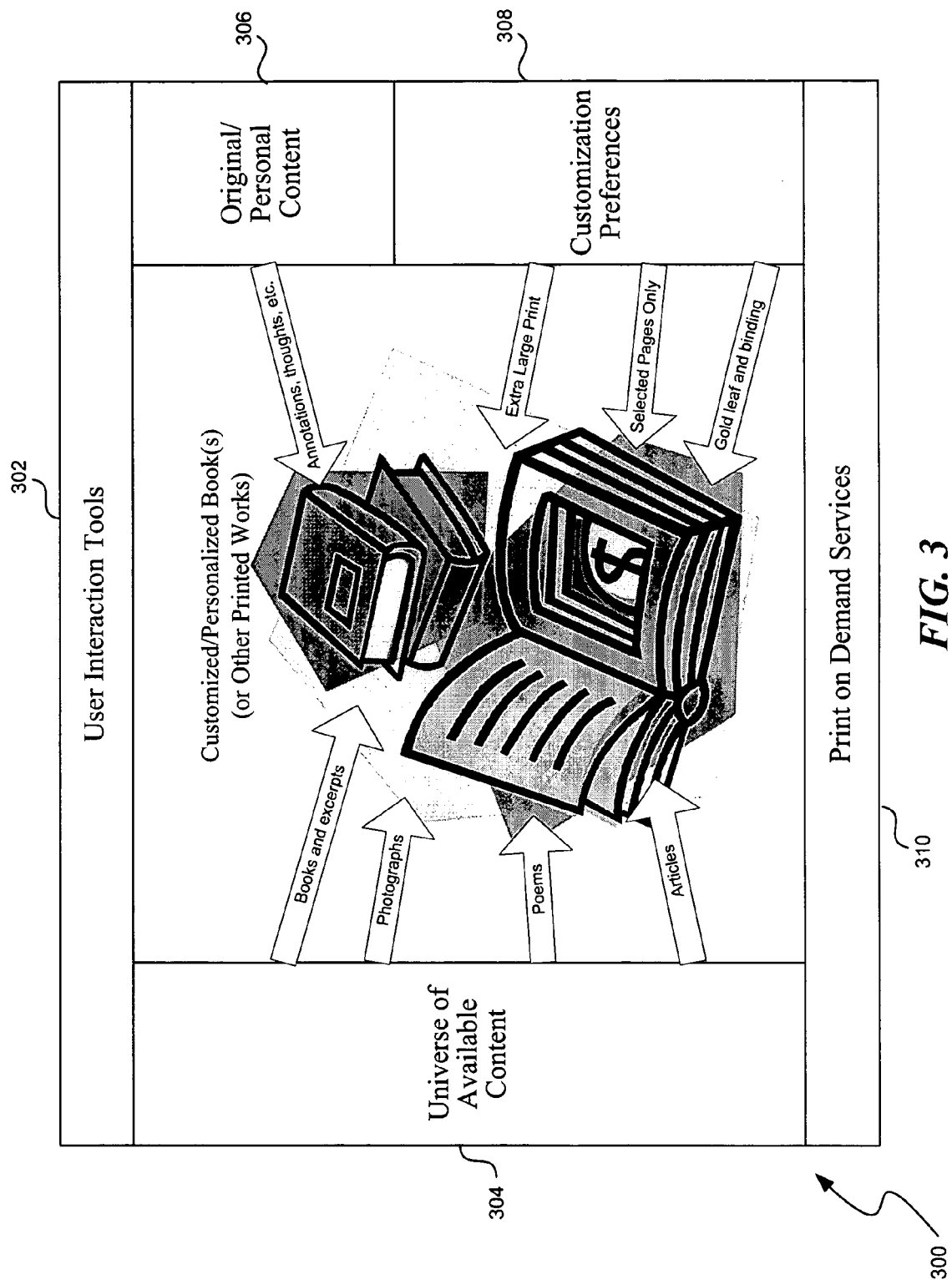
FIG. 3 is a block diagram showing a framework associated with creating customized and/or personalized printed works in some embodiments.

FIG. 3 is a block diagram showing a schematic overview 300 of creating printed works in some embodiments. The printed works may be based on content selected from a universe of available content 304 (e.g., books and excerpts, photographs, poems, and articles) and then aggregated and/or transformed. In some embodiments, a collection of user interaction tools 302 may facilitate the selection and manage the aggregation of the content. The printed works may also be based on original/personal content 306 provided by the user via the user interaction tools 302. In some embodiments, customization preferences and personal touches 308 (e.g., extra large print, selected pages only, etc.) are reflected in the printed works and incorporated via the user interaction tools 302. In some embodiments, print on demand services 310 perform printing of the printed works.

Figure 4:
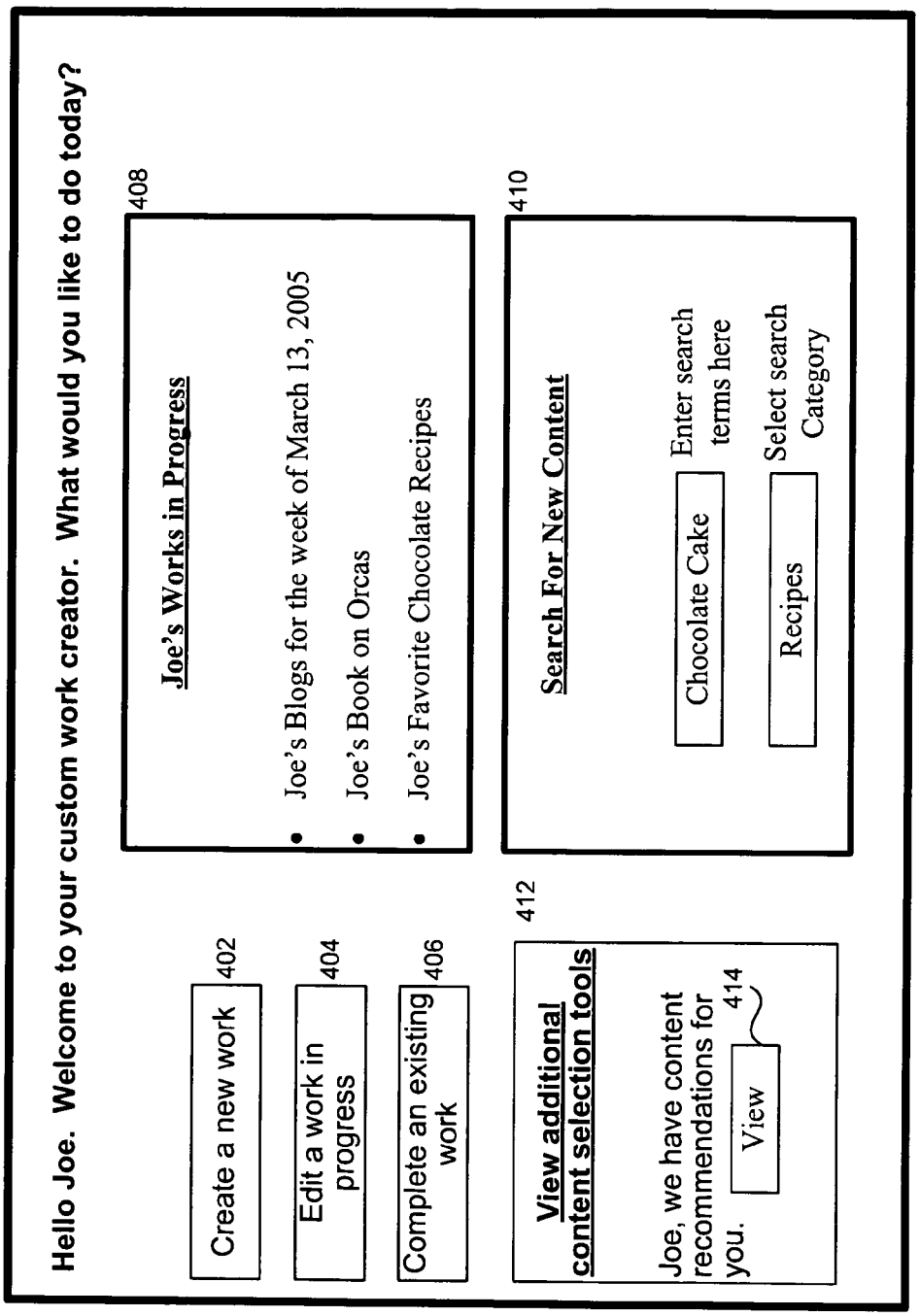
FIG. 4 is a display diagram showing a first interface page, as may be provided by a user interaction tool associated with the facility in some embodiments.
Figure 5:
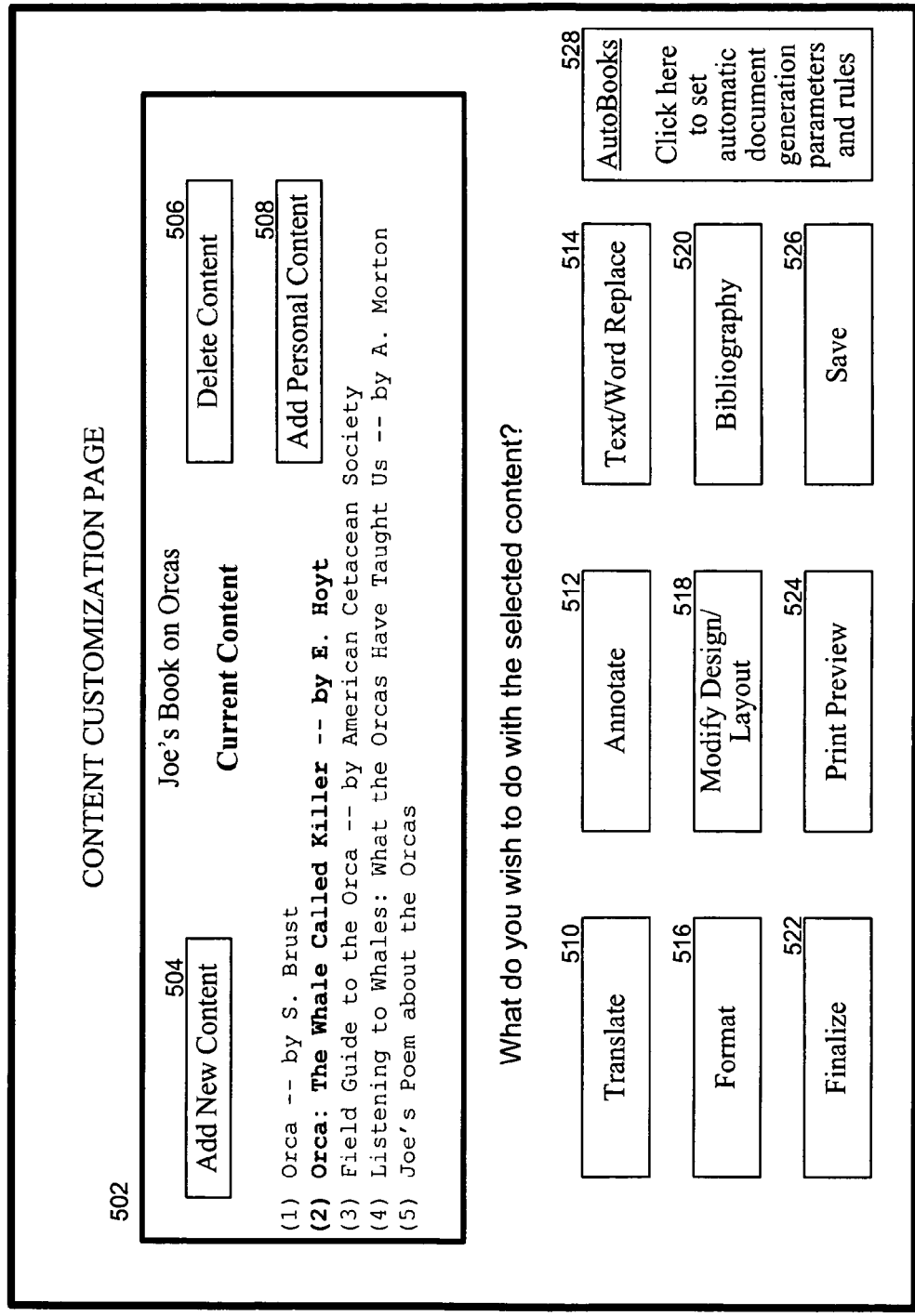
FIG. 5 is a display diagram showing a second interface page, as may be provided by a user interaction tool associated with the facility in some embodiments.

FIGS. 4 and 5 show a visual user interface presented by the facility in some embodiments. FIG. 4 is a display diagram showing a first interface page 400, as may be provided by a user interaction tool associated with the facility. The first interface page 400 may be displayed to a user who has logged in at the facility (e.g., a user named "Joe"). In some embodiments, the first interface page 400 is accessed, at least in part, via an Internet browser application at the user's computer.

From the first interface page 400, the user may begin to create a new printed work by selecting a CREATE A NEW WORK button 402. Likewise, the user may be able to edit a work in progress by selecting an EDIT A WORK IN PROGRESS button 404. The user may also be able to complete an existing work and finalize it for printing/delivery by selecting a COMPLETE AN EXISTING WORK button 406.

In some embodiments, a WORKS IN PROGRESS display area 408 shows various creative works that the user has started but not yet completed. For example, in the illustrated embodiment, the WORKS IN PROGRESS display area 408 includes "Joe's Blogs for the Week of Mar. 13, 2005," "Joe's Book on Orcas," and "Joe's Favorite Chocolate Recipes." In some embodiments, a SEARCH FOR NEW CONTENT display area 410 provides a mechanism through which the user may search for additional works or content to add to either a new work or a work in progress. The SEARCH FOR NEW CONTENT display area 410 may include a text field that allows the user to enter search terms (e.g., "chocolate cake") and a text field that allows the user to select a search category (e.g., "recipes"). In some embodiments, from a VIEW ADDITIONAL CONTENT SELECTION TOOLS display area 412, the user may select to view additional content selection tools, such as tools that provide content recommendations made by the facility (e.g., based on past content viewing habits, purchasing habits, etc.). This may be done by selecting a VIEW button 414. In some cases, content recommendations may recommend content for a custom work that the user is currently assembling, or may include recommendations for material within a custom work. The latter tool may be especially useful for large custom works.

FIG. 5 is a display diagram showing a second interface page 500, as may be provided by a user interaction tool associated with the facility. In some embodiments, the second interface page 500 provides access to tools that allow the user to format, customize, modify, and otherwise transform selected content. Examples include performing foreign language translations, adding annotations or notes, formatting text, replacing selected text, adding bibliographical references, modifying look and feel, etc. Additional examples include customizing the content based on input from filter interfaces (e.g., highlighting selected features, etc.), indexing or summarizing content, etc. In some embodiments, the second interface page 500 may include a CURRENT CONTENT display area 502 that shows content for a currently selected work in progress (e.g., "Joe's Book on Orcas"). Within the CURRENT CONTENT display area 502, the current content for "Joe's Book on Orcas" is displayed and includes five items with a second item that is currently selected (e.g., "Orca: The Whale Called Killer). Several user buttons may be provided in association with the CURRENT CONTENT display area 502, including an ADD NEW CONTENT button 504, a DELETE CONTENT button 506, and an ADD PERSONAL CONTENT 508 button. In the illustrated embodiment, these features allow the user to edit the current content of "Joe's Book on Orcas."

The second interface page 500 may allow the user to access one or more tools to modify or format any currently selected content (e.g., "Orca: The Whale Called Killer") from the current work in progress. For example, the selected content (or, alternatively, the entire work in progress) may be modified using various tools and sub-interfaces (not shown), some or all of which may be accessed via buttons on the second interface page 500. In some embodiments, these buttons may include a TRANSLATE button 510, an ANNOTATE button 512, a TEXT/WORD REPLACE button 514, a FORMAT button 516, a MODIFY DESIGN/LAYOUT button 518, a BIBLIOGRAPHY button 520, a FINALIZE button 522, a PRINT PREVIEW button 524, and a SAVE button 526. The functionality associated with some of these buttons has been previously described with respect to FIG. 2 or is otherwise self-explanatory (e.g., print preview, finalize, save, etc.).

An AUTOBOOKS button 528 may provide the user with access to an interface that allows him or her to set parameters and rules for automatic personalized documents (e.g., generated by the facility and sent to the user as requested and/or on a periodic basis). While not illustrated, the facility may provide any combination or number of tools (and corresponding access features or buttons), either through interface pages, such as those shown above, or through other techniques.

Figure 6:
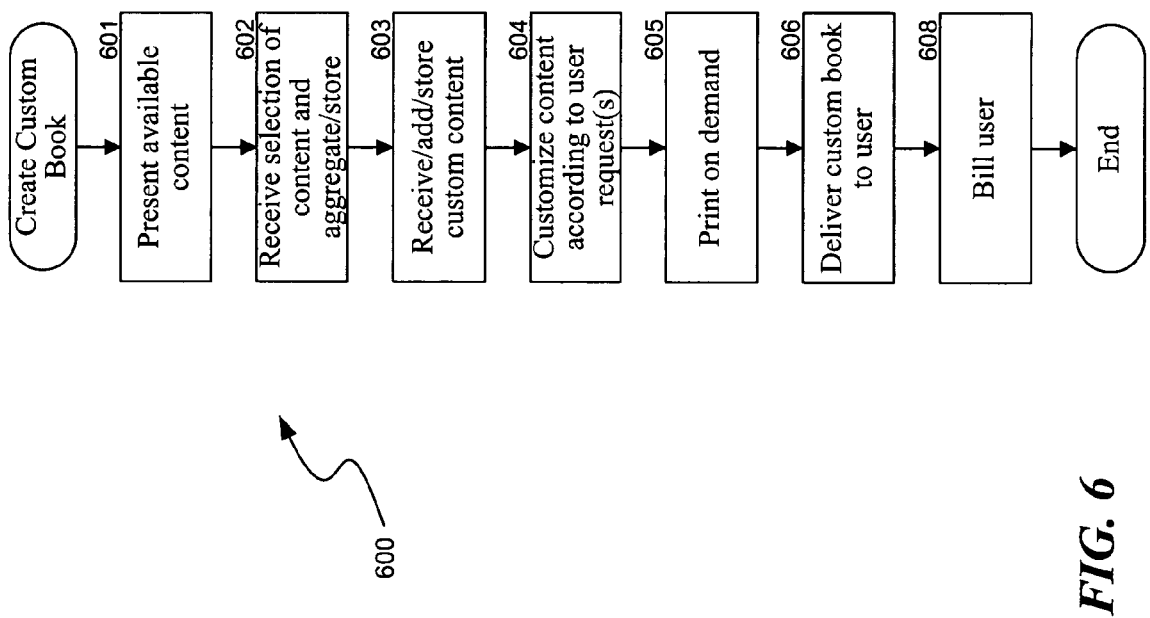
FIG. 6 is a flow diagram showing an example of a routine performed at the facility for creating a customized and/or personalized printed work in some embodiments.

FIG. 6 is a flow diagram showing an example of a routine 600 performed at the facility for creating a custom printed work (e.g., a custom book). At block 601, the facility presents available content to a user (which may include any existing or future materials that can be printed on paper). At block 602, the facility receives the selection of content and collects and/ or aggregates the selected content. In some embodiments, selection occurs manually (e.g., in response to the user providing selection instructions via the user interaction framework). However, selection may also occur at least partially automatically (e.g., based on parameters provided by the user so that the facility can automatically select content on behalf of the user, including future content that is not yet in existence or not yet available). For example, the user may provide instructions so that the facility incorporates all upcoming works from a specified author into the custom work. Likewise, the user may specify that the custom work should include any articles on planting roses that are published in a given set of gardening periodicals over the next two months. In some embodiments, locating and aggregating content may be implemented through the use of technologies such as extensible markup language (XML) feeds (see http://en.wikipedia.org/wiki/Xml) and the RSS file format (see http://en.wikipedia.org/wiki/RSS_%28file_format%29).

At optional block 603, the facility receives original content from the user and adds it to the aggregated selected content. In some embodiments, the facility stores all the selected content (block 602) and all the provided original content (block 603) in a document that can then be manipulated or customized by the user. In other embodiments, the facility retrieves the selected content and transforms it at the time that the content is being processed for printing. At block 604, the facility customizes the content according to user requests and preferences (e.g., commands received directly from the user through a user interface or previously specified rules and parameters). At block 605, the facility prints the finalized custom book (e.g., on demand as requested by the user). In some embodiments, the facility (and/or user) may retain a digital or electronic copy of the work. Such electronically stored copies may be retained as part of a user record, and/or for subsequent use, such as resale to other customers, later reference or personal use by the user. For example, the facility may allow the user to print out or email additional copies of the work for distribution to friends, allow the user to search his or her previous works for an article that they remember reading, etc.

At block 606, the facility initializes delivery of the custom book to the user (e.g., schedules it for shipping). At block 608, the facility bills the user for the custom book. The charge to the user may be based on several factors and many possible billing schemes may be employed. For example, the user may be charged based on royalties paid to original authors or on a per-page, per-book, or per-article basis. The user may also be charged based on the amount or extent of customization, as well as the format of the printed document (e.g., stapled, versus bound, versus leaflets). In some cases, the facility may provide subscriptions, package deals, or flat fees (e.g., for selecting works from various groups, etc.). After billing, the routine 600 ends.

Figure 7:
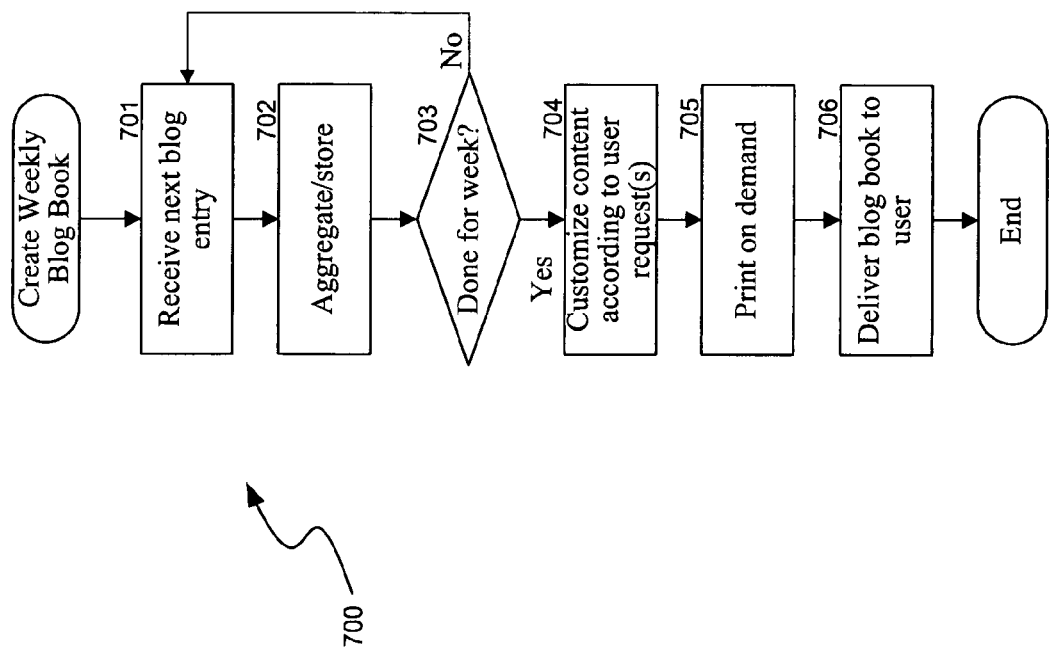
FIG. 7 is a flow diagram showing an example of a routine for creating a periodic blog book for a user in some embodiments.

FIG. 7 is a flow diagram showing an example of a routine 700 for creating a periodic blog book for a user (e.g., a weekly blog book, a monthly blog book, etc.). At block 701, the facility receives a next blog entry from an identified blog. In some cases, the blog entry may be selected by the user based on its content or author. For example, a user may indicate a particular blog environment (such as a blogosphere of interlinked blogs containing certain key blogs), and then choose to have the facility incorporate select blogs (e.g., blogs related to a specified subject or person) from that blog environment into the user's blog book. In other cases, facility automatically selects the blog from an available universe of blogs based on the user's specified interests or based on interests identified by analyzing the user's prior behavior (e.g., visiting web sites, selecting certain categories of content in the past, purchasing items online, clicking on links or advertisements, playing certain categories of online games, etc.).

At block 702, the facility aggregates the received blog entry into a blog book and stores the blog book as a document. At decision block 703, the facility checks if the user is done with adding entries to the blog book for the period. At decision block 703, if the facility has not received all blog book entries for the week, the routine 700 loops back to block 701 to receive the next blog entry. If, however, at decision block 703 the facility has received the last blog entry for the week, the routine 700 continues at block 704 to customize the content of the blog book according to user requests and/or preferences. For example, the user may use the custom interface tools to configure the block book in a desired way or set parameters for automatic configuration. At block 705, the facility prints the blog book on demand as requested by the user. At block 706, the facility delivers the printed blog book to the user. The routine 700 then ends.

Figure 8:
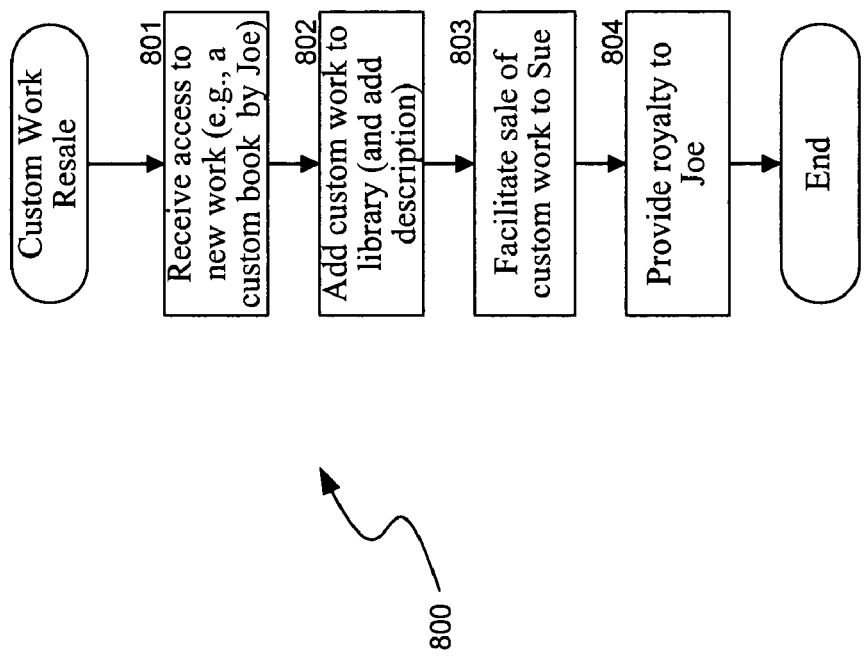
FIG. 8 is a flow diagram showing an example of a routine for reselling custom printed works created by users in some embodiments.

FIG. 8 is a flow diagram showing an example of a routine 800 for reselling custom printable works (such as works created in the context of routines 600 and 700, described above). At block 801, the facility receives a finalized version of a new custom printable work (e.g., a work created by a user named Joe). At block 802, the facility adds the custom work to a custom work library containing available custom works. In addition, the facility may add a description to go along with the custom printable work so that users can understand what content is included in the custom printable work. This description may be provided by the user who created the custom work, by another person, or by the facility (e.g., based on identification of key words within the custom work). At block 803, the facility facilitates the sale of a printed form of the custom work to a second user (e.g., a user named Sue). At block 804, the facility, based on selling the custom work to Sue, provides a royalty to Joe for generating the custom work. The routine 800 then ends.

Figure 9:
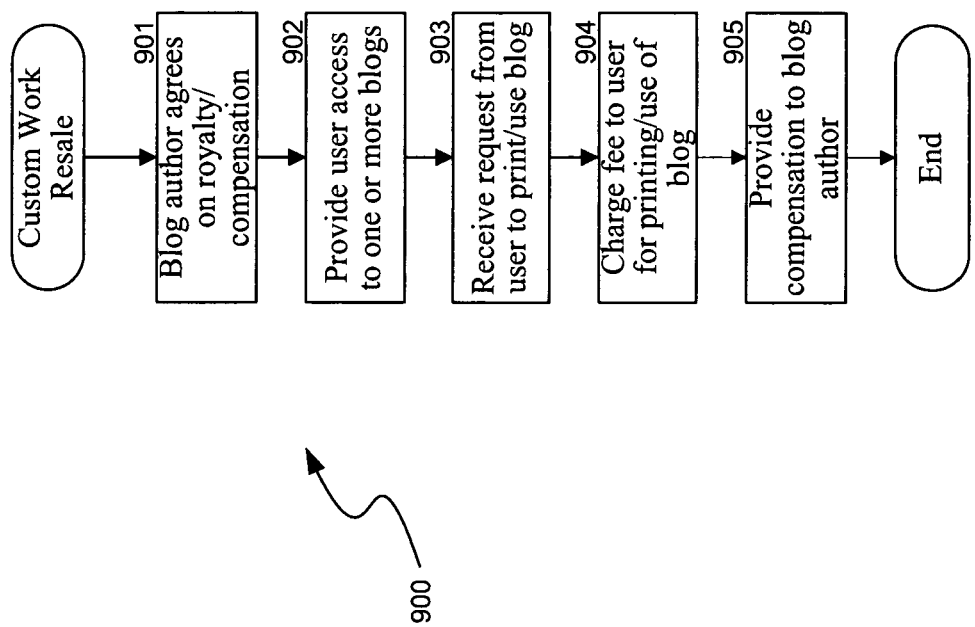
FIG. 9 is a flow diagram showing an example of a routine for providing royalties or other compensation to blog authors who make their blogs available to users for incorporation into a printed work.

FIG. 9 is a flow diagram showing an example of a routine 900 for providing royalties or other compensation to authors who make their blogs (or other content) available to users for printing or for incorporation into a custom printed work. For example, an author (e.g., a blog author) may receive payment each time a user selects one of his or her works for printing or for incorporation into a custom work. At block 901, the author agrees on a royalty/compensation scheme (e.g., price per page printed, price per word printed, price per daily entry printed, etc.) with an administrator of the facility. At block 902, the facility provides user access to one or more blog entries of the author. At block 903, the facility receives a request from a user to include a blog entry in a custom printed work or to print a blog entry. At block 904, the facility charges the user for including the blog entry in a custom work or for printing the blog entry. At block 905, the facility provides a royalty or other compensation to the blog author. The routine 900 then ends.

While the routine 900 described above provides an example of a royalty scheme using the specific example of blog entries, it is also possible to apply royalty/licensing schemes for other types of content (e.g., novels, encyclopedias, images, artwork, etc.) utilized by the facility in creating custom works. Accordingly, the facility may include a licensing clearinghouse component configured to allow authors to select options indicating how they wish to be compensated (if at all) for the use of their works. In some embodiments, the licensing clearinghouse component (and associated database) allows an author to automatically submit their work (or indications of their work) so that it can be added to the universe of content made available by the facility. In addition, the licensing clearinghouse component may allow the author to select from one or more offered licensing programs (e.g., pay by page, pay by word used, pay by work used, etc.). The licensing clearinghouse component may then include an interface to aspects of the facility that automatically tracks the way that the author's works are being used. In this way, the facility may, at least partially, automate the process of compensating the author. The licensing clearinghouse component may allow authors to customize such auto-licensing programs through the use of filters and other interface tools. For example, an author may set a filter indicating that she does not want her work included in any custom works that also include works from another specified author. Likewise, an author may set a filter that prohibits the work from being included in a custom printed work relating to a topic that the author finds offensive, or otherwise undesirable. Similarly, an author may limit the number of times his work may be used in a custom printed work (e.g., during a given time frame).

For authors who have not signed up for a royalty/compensation scheme for the re-distribution of their work, the facility may initiate contact with the author if a user selects the author's work for inclusion in a printed work. For example, if a user indicates an interest in having an author's content made available for inclusion in a customized and/or personalized work, the facility may generate and send an email or other message to the author, indicating that there is an interest in the author's work. This email or message may set forth the particulars of the fee structure under which the author would be compensated, and may provide an option for the author to immediately accept the terms (e.g., by clicking on a button in the email or message or returning to an acceptance web page associated with the facility). In this way, more authors may learn about the facility, thereby providing viral aspects that can benefit both users and authors. For some types of works (such as blogs), an alternative approach for providing royalties to authors may involve including the author's work in a printed work without first getting specific permission, but then holding royalty payments in, for example, an escrow account and notifying the author of the availability of such royalty payments. In such a case, the author may be contacted by an email or other message that indicates that he or she has funds available for collection. In some cases, the actual printing and/or delivery of the printed work may be delayed until the author has collected the funds or otherwise agreed to the use of his or her work.

In some embodiments, it may be possible to employ a multi-tier compensation program where both authors and third parties, such as external content aggregators, may be compensated for allowing their content to be included in customized and/or personalized printed works. For example, many web sites and services exist that aggregate content from other sources. These web sites and services sometimes provide an easy way for users to select content for inclusion in customized and/or personalized printed works. For example, a user may indicate that he or she wishes to have a printed work containing daily top stores from a third party web site (e.g., the "Drudge Report"). In such a case, it may be appropriate to compensate both the third party and the author for the inclusion of the content in the customized and/or personalized printed work.

In some embodiments, the facility implements other schemes for compensating authors and/or creators of custom printable works when their materials are made available for other users of the facility. For example, in some embodiments, the facility includes advertisements in custom works generated by the facility. The advertisements may be specially tailored for the user and/or may relate to the content selected for inclusion in the custom work. More specifically, the facility may include an advertisement selection tool that automatically selects advertisements for the printed work based on metadata associated with the selected content (e.g., metadata indicating a category or topic associated with the contents), or based on the presence of certain text (e.g., key words or phrases) within the content itself. For example, the advertisement tool may select dog food advertisements for placement in a custom printed work containing various types of information about Golden Retrievers. Likewise, the advertisement tool may select computer-related advertisements for a blog book containing blogs about computer programming. The advertisement tool may also be configured to consider contents of a user's past custom works in selecting advertisements for a current work in progress. In addition, the advertisement tool may select advertisements for users based on other data, such as user demographics or may select advertisements randomly from a pool of available advertisements.

In some embodiments, the facility charges advertisers who have their advertisements placed in custom printed works a fee for this service (in addition to or instead of the user being charged a fee for the generation of the custom work). In some cases, a user may specifically elect to include advertisements in a custom printed work to offset the fee charged to the user. Alternatively, the facility may place advertisements in printed works by default and then charge a premium to those users who wish to generate a custom work that is free of advertisements. In some embodiments, the provider of the facility shares some or all of the revenue created by advertising dollars with rights holders (e.g., blog authors, book authors, journal authors, artists, poets, etc.); in some embodiments, the provider of the facility retains the generated revenue.

In addition to advertisements, the facility may provide bonus content in association with providing printed works. This bonus content may be related to a printed work by topic, and is intended to enrich the user's experience. Examples of such bonus content include recommended articles, games (e.g., cross-word puzzles, trivia questions, etc.), coupons, extra images, etc. In some cases, the facility may give the user an option of whether he or she wishes to receive such bonus material. Likewise, the facility may provide the user with the option of selecting to receive the bonus content separately from the printed work (e.g., in a separate printed document).

It will be appreciated by those skilled in the art that the above-described facility may be straightforwardly adapted or extended in various ways. For example, while the examples above primarily describe printing single works, in some embodiments, the facility prints multiple works or printed materials (e.g., allows breaking up a single book into multiple volumes that are easy to carry around or distributing multiple copies of the same work to friends, employees, etc.). Also, while several specific customization, personalization, and formatting tools are described above, many other types of tools may be provided. On the other hand, the facility may omit various tools and functionality described herein. While the foregoing description makes reference to particular embodiments, the scope of the invention is defined solely by the claims that follow and the elements recited therein.

We claim:

1. A system for generating printed works containing customized or personalized content, the system comprising:
at least one data storage component including indications of content, wherein the indications of content are associated with items of content that comprise a collection of content, and wherein the items of content are available for incorporation into printed works containing customized or personalized content; and a printed work generation system including:
- a user interaction framework configured for providing aspects of a user interface, wherein the user interaction framework is configured for:
  - providing access to the indications of content,
  - receiving content selection instructions for selecting items of content from the collection of content, and
  - receiving user instructions for transforming the selected items of content after aggregation;
- a content aggregation component configured for:
  - retrieving the selected items of content by referencing the at least one data storage component based on the content selection instructions,
  - aggregating the retrieved items of content into an electronic document, and
  - transforming the selected items of content in accordance with the user instructions; and
- a print on demand component configured for generating a printed work containing custom content based on the electronic document.

2. The system of claim 1 wherein the user interaction framework includes a tool for incorporating original works into the electronic document.

3. The system of claim 1 wherein the user interaction framework includes a content selection tool that provides content searching capabilities, content browsing capabilities, or both content browsing and content searching capabilities.

4. The system of claim 1 wherein the user interaction framework includes a content recommendation tool that provides content recommendations to users based on user history information.

5. The system of claim 1 wherein the at least one data storage component includes an electronic form of at least some of the items of content.

6. The system of claim 1 wherein the user interaction framework includes an annotation tool that allows users to add annotations to the electronic document for presentation in the printed work.

7. The system of claim 1 wherein the transforming includes allowing users to specify a design and layout for content in the electronic document for presentation in the printed work.

8. The system of claim 1 wherein the user interaction framework includes a bibliography tool that allows users to automatically create a bibliography section relating to the selected items of content, wherein the bibliography section is for presentation in the printed work.

9. The system of claim 1 wherein the user interaction framework includes a word/text replacement tool allowing for global replacements of specified text within the electronic document for presentation in the printed work.

10. The system of claim 1 wherein the user interaction framework includes a tool for specifying delivery preferences for the printed work.

11. The system of claim 1 wherein the user interaction framework includes a tool for specifying binding preferences for printed works containing customized or personalized content.

12. The system of claim 1 wherein the user interaction framework includes a rules and preferences input tool that allows users to input rules and preferences associated with controlling the automatic selection of content by the aggregation component to create single instances of printed works containing personalized content.

13. The system of claim 1 wherein the user interaction framework includes a rules and preferences input tool that allows users to input rules and preferences associated with controlling the automatic selection of content by the aggregation component to periodically create printed works containing personalized content.

14. The system of claim 1 wherein the user interaction framework includes one or more tools for automatically creating a glossary relating to the selected items of content, wherein the glossary is for presentation in the printed work.

15. The system of claim 1 wherein the user interaction framework includes one or more tools that automatically create an index relating to the selected items of content, wherein the index is for presentation in the printed work.

16. The system of claim 1 wherein the user interaction framework includes one or more tools that automatically create a table of contents relating to the selected items of content, wherein the table of contents is for presentation in the printed work.

17. A system for generating a printed work, the system comprising:
- means for electronically providing in at least one computing system, a user with access to information about a collection of content that is available for incorporation into printed works containing a customized aggregation of content;
- means for receiving, in the at least one computing system, content selection instructions from the user for selecting at least two distinct items of content from the collection of content;
- means for selecting and retrieving, in the at least one computing system, the at least two distinct items of content from the collection of content based on the content selection instructions;
- means for aggregating, in the at least one computing system, the at least two retrieved items of content into an electronic aggregation of information;
- means for transforming, in the at least one computing system, the at least two items of content within the electronic aggregation of information based on user formatting instructions; and
- means for generating, in the at least one computing system, a printed work containing content based on the electronic aggregation of information, wherein the content includes the at least two transformed items of content;
- wherein the means for selecting and retrieving, in the at least one computing system, the at least two distinct items of content from the collection of content based on the content selection instructions employ RSS.

18. A method for providing publications of interest to users, comprising:
- obtaining permission from a first user to offer a custom or personalized printable work for sale, wherein the customized or personalized printable work is generated by a method comprising:
  - providing the first user with access to information about a collection of content that is available for incorporation into customized or personalized printable works;
  - receiving content selection instructions from the first user for selecting items of content from the collection of content;
  - selecting and retrieving the items of content from the collection of content based on the content selection instructions from the first user;
  - aggregating the retrieved items of content into an electronic document;
  - transforming the items of content within the electronic document based on formatting instructions from the first user; and configuring the customized or personalized printable work for the first user, wherein the customized or personalized printable work contains content based on the electronic document;

displaying information indicating that the customized or personalized printable work is for sale;

receiving, from a second user, an offer to purchase the customized or personalized printable work;

generating a copy of the customized or personalized printable work for delivery to the second user; and providing a royalty or payment to the first user for the purchase of the customized or personalized printable work by the second user.

19. The method of claim 18 further comprising transforming the items of content within the electronic document based on formatting instructions from the second user prior to generating a copy of the customized or personalized printable work for delivery to the second user.

20. A method for providing printed blog entries of interest to users, comprising:

electronically receiving one or more blog journal entries from a first user;

storing each of the electronically received blog journal entries into a collection of blog journal entries associated with the first user or associated with a topic relating to the one or more blog journal entries;

providing a second user with access to the one or more blog journal entries, wherein the access includes print on demand services;

receiving instructions from the second user for generating a printed work from the one or more blog journal entries;

in response to the received instructions,
  selecting and retrieving the stored blog journal entries from the collection of blog journal entries, and
  generating a printed work containing text, images, or both text and images associated with the retrieved blog journal entries;

providing advertising opportunities associated with the one or more blog journal entries;

including advertisements in the printed work; and charging a fee to an advertiser for including the advertisements in the printed work.

21. A method for providing printed blog entries of interest to users, comprising:

electronically receiving one or more blog journal entries from a first user;

storing each of the electronically received blog journal entries into a collection of blog journal entries associated with the first user or associated with a topic relating to the one or more blog journal entries;

providing a second user with access to the one or more blog journal entries, wherein the access includes print on demand services;

receiving instructions from the second user for generating a printed work from the one or more blog journal entries;

in response to the received instructions,
  selecting and retrieving the stored blog journal entries from the collection of blog journal entries, and
  generating a printed work containing text, images, or both text and images associated with the retrieved blog journal entries;

providing advertising opportunities associated with the one or more blog journal entries;

including advertisements in the printed work, wherein including the advertisements is based on an election by the second user to include the advertisements;

charging a fee to an advertiser for including the advertisements in the printed work; and offsetting a fee charged to the second user based on including the advertisements in the printed work.

22. A method for providing printed blog entries of interest to users, comprising:

electronically receiving one or more blog journal entries from a first user;

storing each of the electronically received blog journal entries into a collection of blog journal entries associated with the first user or associated with a topic relating to the one or more blog journal entries;

providing a second user with access to the one or more blog journal entries, wherein the access includes print on demand services;

receiving instructions from the second user for generating a printed work from the one or more blog journal entries;

in response to the received instructions,
  selecting and retrieving the stored blog journal entries from the collection of blog journal entries, and
  generating a printed work containing text, images, or both text and images associated with the retrieved blog journal entries;

providing advertising opportunities associated with the one or more blog journal entries;

including advertisements in the printed work;

charging a fee to an advertiser for including the advertisements in the printed work; and after receiving payment of the fee, providing at least a portion of the received fee to the first user.

23. A method for providing printed blog entries of interest to users, comprising:

electronically receiving one or more blog journal entries from a first user;

storing each of the electronically received blog journal entries into a collection of blog journal entries associated with the first user or associated with a topic relating to the one or more blog journal entries;

providing a second user with access to the one or more blog journal entries, wherein the access includes print on demand services;

receiving instructions from the second user for generating a printed work from the one or more blog journal entries;

in response to the received instructions,
  selecting and retrieving the stored blog journal entries from the collection of blog journal entries, and
  generating a printed work containing text, images, or both text and images associated with the retrieved blog journal entries;

prior to selecting and retrieving the stored blog journal entries from the collection of blog journal entries, providing an indication to the first user that his or her blog journal entry has been selected for inclusion in a printed work; and requesting permission from the first user for including the blog journal entry in the printed work, in exchange for a fee.

* * * * *